US012591512B2

(12) United States Patent
Choi et al.

(10) Patent No.: US 12,591,512 B2
(45) Date of Patent: Mar. 31, 2026

(54) STORAGE DEVICE ALLOCATING TARGET STORAGE AREA FOR TARGET APPLICATION, SYSTEM AND OPERATING METHOD OF THE STORAGE DEVICE

(71) Applicant: SK hynix Inc., Icheon-si (KR)

(72) Inventors: Hyeong Jae Choi, Icheon-si (KR); Hui Jae Yu, Icheon-si (KR); Jung Hyun Joh, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 60 days.

(21) Appl. No.: 18/486,780

(22) Filed: Oct. 13, 2023

(65) Prior Publication Data

US 2024/0411686 A1    Dec. 12, 2024

(30) Foreign Application Priority Data

Jun. 8, 2023    (KR) ........................ 10-2023-0073260

(51) Int. Cl.
*G06F 12/02*          (2006.01)
(52) U.S. Cl.
CPC ................................. *G06F 12/0246* (2013.01)
(58) Field of Classification Search
CPC ................................................... G06F 12/0246
See application file for complete search history.

(56) References Cited

U.S. PATENT DOCUMENTS

| | | | | |
|---|---|---|---|---|
| 2004/0019745 A1* | 1/2004 | Espeseth | ............... | G06F 3/0659 |
| | | | | 711/112 |
| 2009/0006762 A1* | 1/2009 | Gara | ................... | G06F 12/0862 |
| | | | | 711/137 |
| 2014/0101389 A1* | 4/2014 | Nellans | ............... | G06F 12/0862 |
| | | | | 711/137 |
| 2016/0004460 A1* | 1/2016 | Sato | ....................... | G06F 3/0689 |
| | | | | 709/219 |
| 2018/0173620 A1* | 6/2018 | Cen | ........................ | G06F 3/0652 |
| 2019/0212946 A1* | 7/2019 | Kim | ........................ | G11C 16/10 |
| 2019/0370043 A1* | 12/2019 | Olderdissen | .......... | G06F 3/0604 |
| 2022/0318050 A1 | 10/2022 | Gokam et al. | | |
| 2023/0009138 A1* | 1/2023 | Tal | ......................... | G06F 3/0659 |

FOREIGN PATENT DOCUMENTS

KR      10-2008-0030756 A      4/2008

* cited by examiner

*Primary Examiner* — Nanci N Wong

(57) ABSTRACT

A storage device may receive an allocation command, from a host, requesting allocation of a target storage area accessible only to a target application among a plurality of applications running on the host. The storage device may set one or more of the plurality of memory blocks as the target storage area based on the allocation command, and control an operation on the target storage area based on feature information of the target storage area received from the host.

10 Claims, 15 Drawing Sheets

ALLOC_CMD

START_ADDR

SIZE

FEAT_INFO

PAT_INFO

| access pattern | description |
|---|---|
| Sequential pattern | TGT_AREA is sequentially accessed |
| Random pattern | TGT_AREA is randomly accessed |
| ⋮ | ⋮ |

_PAT_INFO = random_

*FIG.11*

MT_INFO = not required

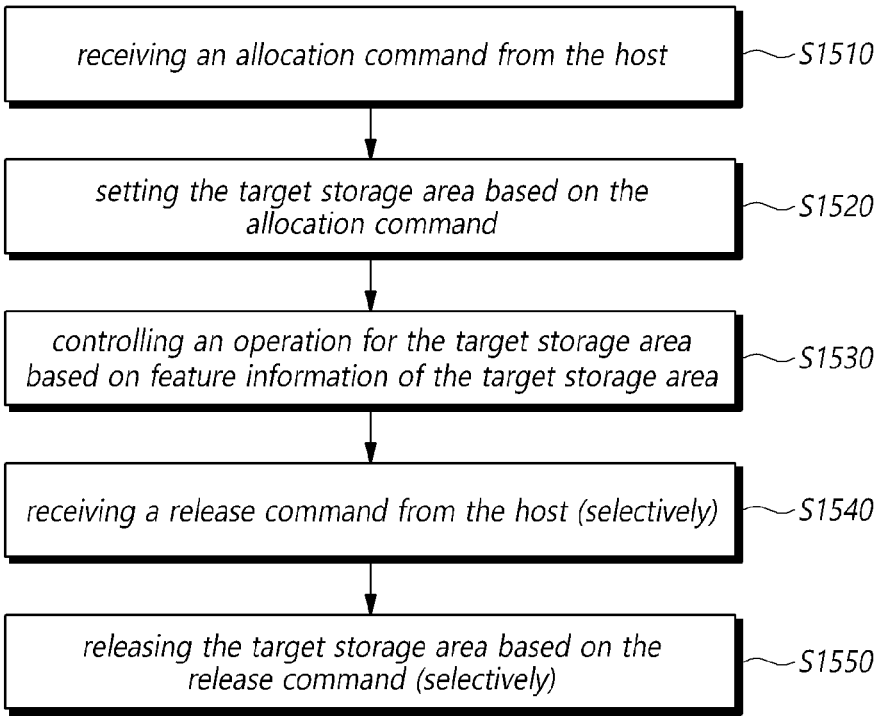

receiving an allocation command from the host          ~S1510 setting the target storage area based on the
allocation command          ~S1520 controlling an operation for the target storage area
based on feature information of the target storage area          ~S1530 receiving a release command from the host (selectively)          ~S1540 releasing the target storage area based on the
release command (selectively)          ~S1550

STORAGE DEVICE ALLOCATING TARGET STORAGE AREA FOR TARGET APPLICATION, SYSTEM AND OPERATING METHOD OF THE STORAGE DEVICE

CROSS-REFERENCE TO RELATED APPLICATION

The present application claims priority under 35 U.S.C. § 119 (a) to Korean patent application number 10-2023-0073260 filed in the Korean Intellectual Property Office on Jun. 8, 2023, which is incorporated herein by reference in its entirety.

BACKGROUND

1. Technical Field

Various embodiments generally relate to a storage device allocating a target storage area for target application, a system and an operating method of the storage device.

2. Related Art

A storage device is a device for storing data according to a request from an external device such as a computer, a mobile terminal such as a smart phone or tablet, or the like.

A storage device may further include a memory for storing data and a controller for controlling the memory. The memory may be a volatile memory or a non-volatile memory. The controller may receive a command from an external device (i.e., a host), and execute or control operations to read, write, or erase data in the memory included in the storage device, according to the received command.

In general, in order to increase the accessibility of data stored in the storage device, the storage device may be partitioned into storage areas that have fixed locations. However, a method for transmitting how the external device partitions the storage device may not be defined explicitly, and as a result a loss of stored data may occur in the process of changing the partitioned storage areas.

SUMMARY

Embodiments of the present disclosure provide a storage device capable of improving performance and reliability by managing data stored in a storage area corresponding to an application according to features of the storage area, a system including the storage device, and an operating method of the storage device.

In one aspect, embodiments of the disclosure may provide a storage device including i) a memory including a plurality of memory blocks, and ii) a controller configured to receive an allocation command, from a host, requesting allocation of a target storage area accessible only to a target application among a plurality of applications running on the host, set one or more of the plurality of memory blocks as the target storage area based on the allocation command, and control an operation on the target storage area based on feature information of the target storage area received from the host.

In another aspect, embodiments of the disclosure may provide an operating method of a storage device including i) receiving an allocation command, from a host, requesting allocation of a target storage area accessible only to a target application from among a plurality of applications running on a host, ii) setting the target storage area based on the allocation command, and iii) controlling an operation for the target storage area based on feature information of the target storage area received from the host.

In one aspect, embodiments of the disclosure may provide a system including i) a host executing a plurality of applications, and ii) a storage device configured to receive an allocation command, from a host, requesting allocation of a target storage area accessible only to a target application among a plurality of applications running on the host, set one or more of a plurality of memory blocks as the target storage area based on the allocation command, and control an operation for the target storage area based on feature information of the target storage area received from the host.

According to embodiments of the present disclosure, it is possible to improve performance and reliability by managing data stored in a storage area corresponding to an application according to feature of the storage area.

BRIEF DESCRIPTION OF THE DRAWINGS

FIGS. 11 to 13 illustrate an operation in which a storage device determines whether to maintain write data in a buffer based on maintenance information according to embodiments of the present disclosure.

FIG. 14 illustrates an operation in which a storage device releases a target storage area according to embodiments of the present disclosure.

FIG. 15 illustrates an operating method of a storage device according to embodiments of the present disclosure.

DETAILED DESCRIPTION

Figure 1:
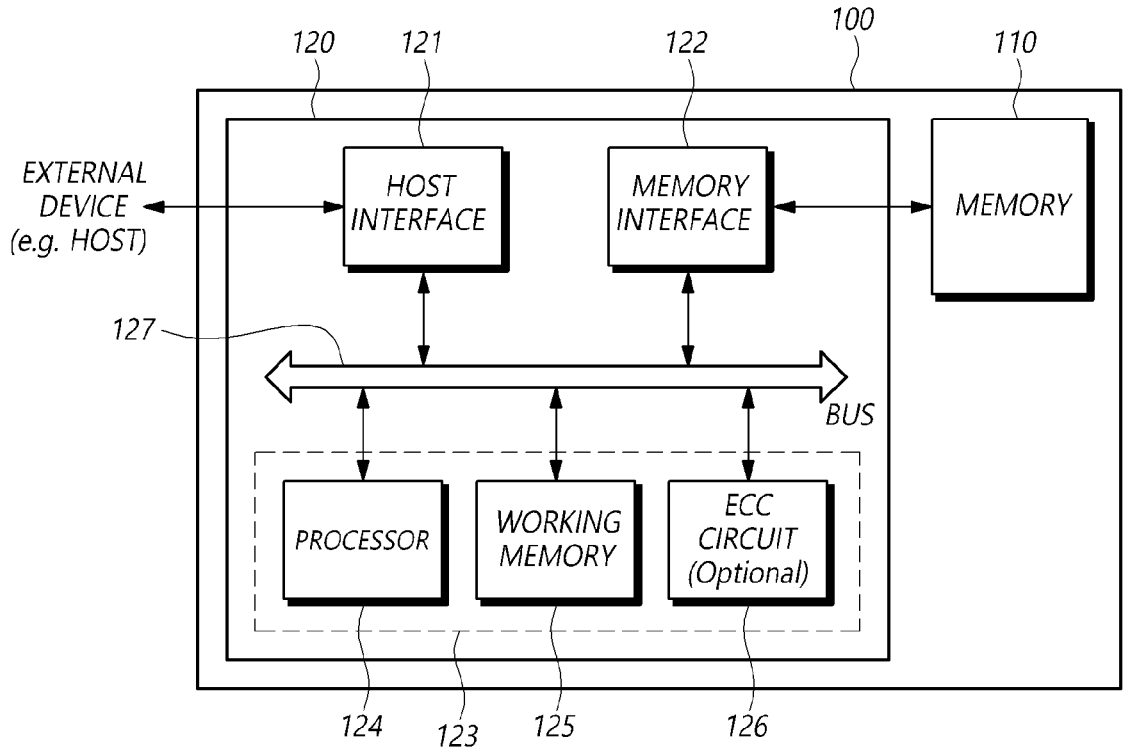
FIG. 1 is a schematic configuration diagram of a storage device according to an embodiment of the disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device according to an embodiment of the disclosure.

Referring to FIG. 1, a storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data. Such a memory cell array may exist in a memory block.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. In other words, the memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, also may control the operation of the memory 110 regardless or in the absence of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any one of various electronic devices that require the storage device 100 to be capable of storing data.

The host may include at least one operating system (OS). The operating system may generally manage and control the function and operation of the host, and may control interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience in explanation, descriptions will describe the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one from among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may execute logical operations required to perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (drive) firmware loaded in the working memory 125 upon booting. Hereafter, an operation of the storage device 100 according to embodiments of the disclosure will be described as implementing a processor 124 that executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer (FTL), which performs a translating function between a logical address requested to the storage device 100 from the host and a physical address of the memory 110; a host interface layer (HIL), which serves to analyze a command requested to the storage device 100 as a storage device from the host and transfer the command to the flash translation layer (FTL); and a flash interface layer (FIL), which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware, in which a logic calculation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include for example management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one from among an SRAM (static RAM), a DRAM (dynamic RAM) and an SDRAM (synchronous DRAM). Meanwhile, the controller 120 may additionally use a separate volatile memory (e.g. SRAM, DRAM) located outside the controller 120 in addition to the working memory 125.

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate (BER) is higher than a reference value, the error detection and correction circuit 126 may determine that a corresponding sector is uncorrectable or a fail. On the other hand, when a bit error rate (BER) is lower than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector that is uncorrectable in read data last. There may be one or more sectors that are determined to be uncorrectable. The error detection and correction circuit 126 may transfer information (e.g., address information) regarding a sector that is determined to be uncorrectable to the processor 124.

A bus 127 may be configured to provide channels among the components 121, 122, 124, 125 and 126 of the controller 120. The bus 127 may include, for example, a control bus for transferring various control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
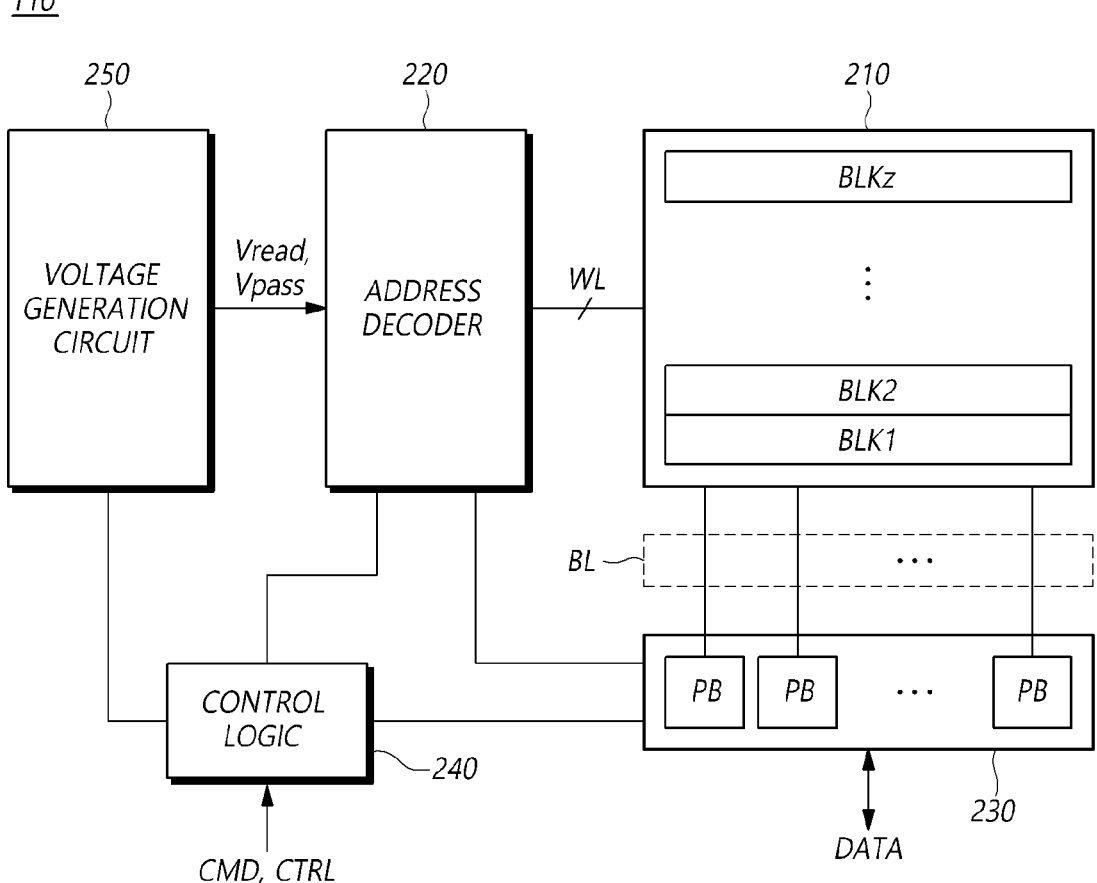
FIG. 2 is a block diagram schematically illustrating a memory of FIG. 1.

FIG. 2 is a block diagram schematically illustrating a memory of FIG. 1.

Referring to FIG. 2, a memory 110 may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure. Each of the plurality of memory cells included in the memory cell array 210 may store at least 1-bit data. For instance, each of the plurality of memory cells included in the memory cell array 210 may be a signal level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address and a column address.

The address decoder 220 may select one memory block and one word line depending on a block address and a row address. A column address may be decoded by the address decoder 220 and be provided to the read and write circuit 230.

The address decoder 220 may include at least one from among a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation and a program verify operation, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. As an exemplary embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell (MC) may include a drain, a source and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
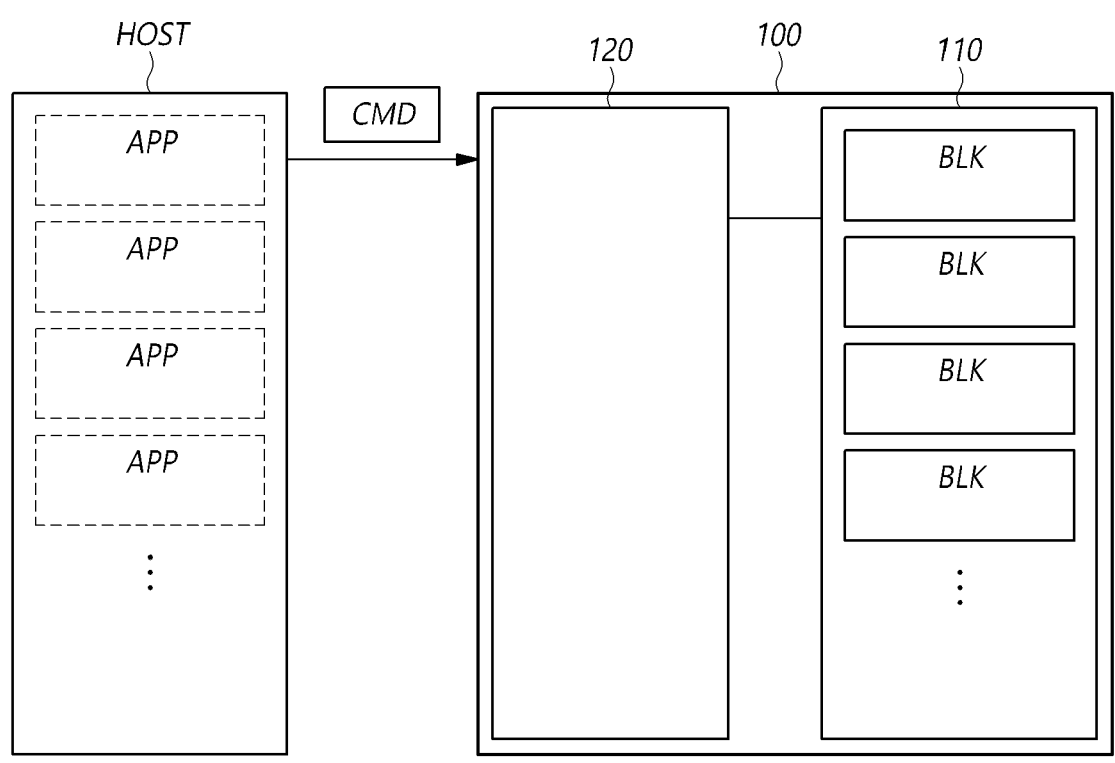
FIG. 3 illustrates a schematic structure of a system according to embodiments of the present disclosure.

FIG. 3 illustrates a schematic structure of a system according to embodiments of the present disclosure.

Referring to FIG. 3, a system 10 may include a host HOST and a storage device 100.

The storage device 100 may include a memory 110 and a controller 120.

The memory 110 may include a plurality of memory blocks BLK. The plurality of memory blocks BLK may store data. The plurality of memory blocks BLK may include one or more pages.

The controller 120 may receive a command CMD from the host HOST. The controller 120 may control the memory 110 based on the received command CMD.

The host HOST may execute a plurality of applications APP. The plurality of applications APP may be executed based on the operating system of the host HOST. The plurality of applications APP may access the storage device 100 through the host HOST. The plurality of applications APP may write data to the storage device 100 and read data from the storage device 100.

In the embodiments of the present disclosure, the controller 120 of the storage device 100 may receive an allocation command CMD, from the host HOST, which is a command requesting allocation of a target storage area accessible only to a target application from among the plurality of applications APP running on the host HOST.

The controller 120 may set the target storage area and control an operation for the target storage area based on feature information of the target storage area received from the host HOST.

An operation of setting a target storage area by the storage device 100 will be described in detail in FIG. 4.

Figure 4:
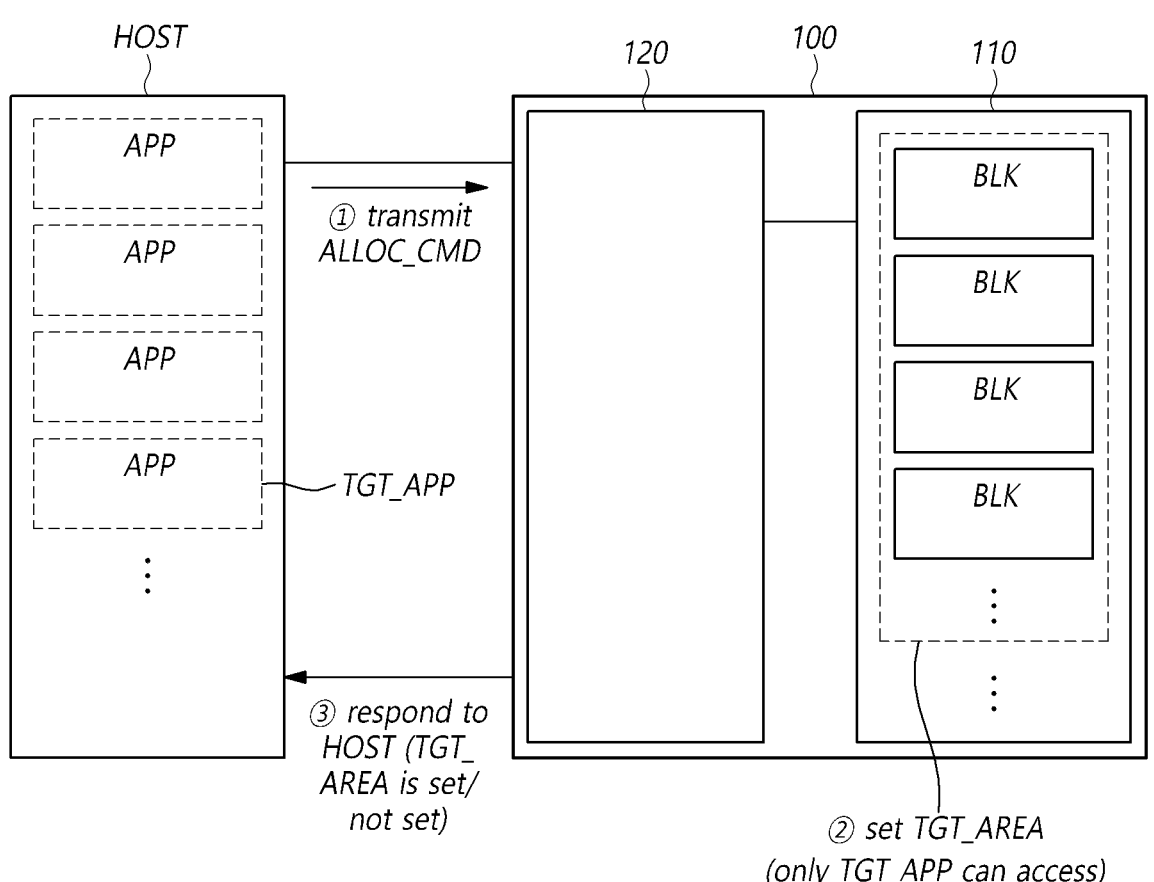
FIG. 4 illustrates an operation in which a storage device sets a target storage area according to embodiments of the present disclosure.

FIG. 4 illustrates an operation in which a storage device sets a target storage area according to embodiments of the present disclosure.

Referring to FIG. 4, a host HOST may transmit an allocation command ALLOC_CMD to a storage device 100 (①). The allocation command ALLOC_CMD is a command requesting allocation of a target storage area accessible only to a target application TGT_APP from among a plurality of applications APP running on the host HOST.

A controller 120 of the storage device 100 may set one or more of a plurality of memory blocks BLK as a target storage area TGT_AREA based on the received allocation command ALLOC_CMD (②). FIG. 4 illustrates a target storage area TGT_AREA as one contiguous area, as an example, but the target storage area TGT_AREA may be composed of a plurality of discontinuous sub areas in other embodiments.

The target storage area TGT_AREA may be accessible only to the target application TGT_APP from among the plurality of applications APP. The target application TGT_APP may write data to the target storage area TGT_AREA and read data stored in the target storage area TGT_AREA. However, applications other than the target application TGT_APP cannot write data to the target storage area TGT_AREA and cannot read data stored in the target storage area TGT_AREA.

The controller 120 may transmit, in response to the allocation command ALLOC_CMD, information indicating whether the target storage area TGT_AREA is set to the host HOST (3). The host HOST may determine whether setting the target storage area TGT_AREA has succeeded or failed based on the information received.

The structure of the allocation command ALLOC_CMD described above will be described below.

Figure 5:
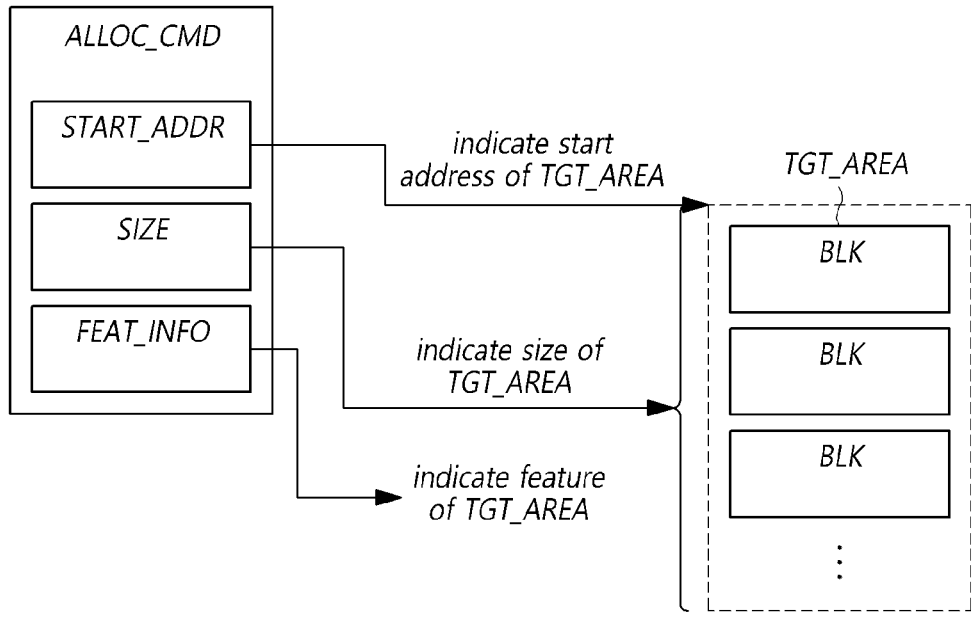
FIG. 5 illustrates an example of a structure of an allocation command according to embodiments of the present disclosure.

FIG. 5 illustrates an example of a structure of an allocation command according to embodiments of the present disclosure.

Referring to FIG. 5, an allocation command ALLOC_CMD may include start address information START_ADDR, size information SIZE, and feature information FEAT_INFO of a target storage area TGT_AREA.

The start address information START_ADDR may indicate an address where the target storage area TGT_AREA starts. For example, the start address information START_ADDR may indicate a value of a logical address corresponding to a start physical address of the target storage area TGT_AREA. When setting the target storage area TGT_AREA, a controller 120 may set a mapping table in a memory 110 such that the start physical address of the target storage area TGT_AREA is mapped with the start address information START_ADDR.

The size information SIZE may indicate the size of the target storage area TGT_AREA. The controller 120 may set the target storage area TGT_AREA with the size indicated by the size information SIZE.

The feature information FEAT_INFO may indicate a feature used by the controller 120 to control an operation of the target storage area TGT_AREA.

FIG. 5 illustrates the allocation command ALLOC_CMD with the start address information START_ADDR, the size information SIZE, and the feature information FEAT_INFO as an example, but one or more of the start address information START_ADDR, the size information SIZE, and the feature information FEAT_INFO may be transmitted to the storage device 100 through a separate command. For example, the host HOST may transmit the start address information START_ADDR and the size information SIZE to the controller 120 through the allocation command ALLOC_CMD, and transmit the feature information FEAT_INFO through a separate command to the controller 120.

Hereinafter, the aforementioned feature information FEAT_INFO will be described in more detail.

Figure 6:
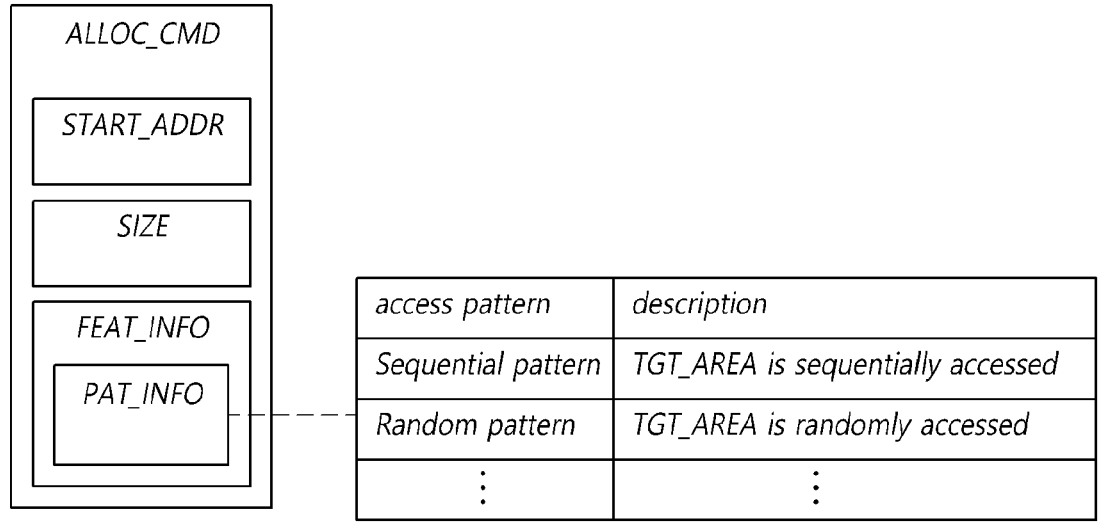
FIG. 6 illustrates an example of feature information according to embodiments of the present disclosure.

FIG. 6 illustrates an example of feature information according to embodiments of the present disclosure.

Referring to FIG. 6, feature information FEAT_INFO may include pattern information PAT_INFO. The pattern information PAT_INFO may indicate a predicted access pattern of a target application TGT_APP when accessing a target storage area TGT_AREA.

The pattern information PAT_INFO may be one of a plurality of candidate pattern information units. Random pattern and sequential pattern may be types of the plurality of candidate pattern information units.

A sequential pattern may indicate that the target application TGT_APP is expected to sequentially access the target storage area TGT_AREA.

A random pattern may indicate that the target application TGT_APP is expected to randomly access the target storage area TGT_AREA, without a predetermined order.

In addition to random pattern and sequential pattern, other pattern may be included in the plurality of candidate pattern information units. For example, a general pattern indicating that there is no predetermined predicted access pattern may also be one pattern included in the plurality of candidate pattern information units.

Figure 7:
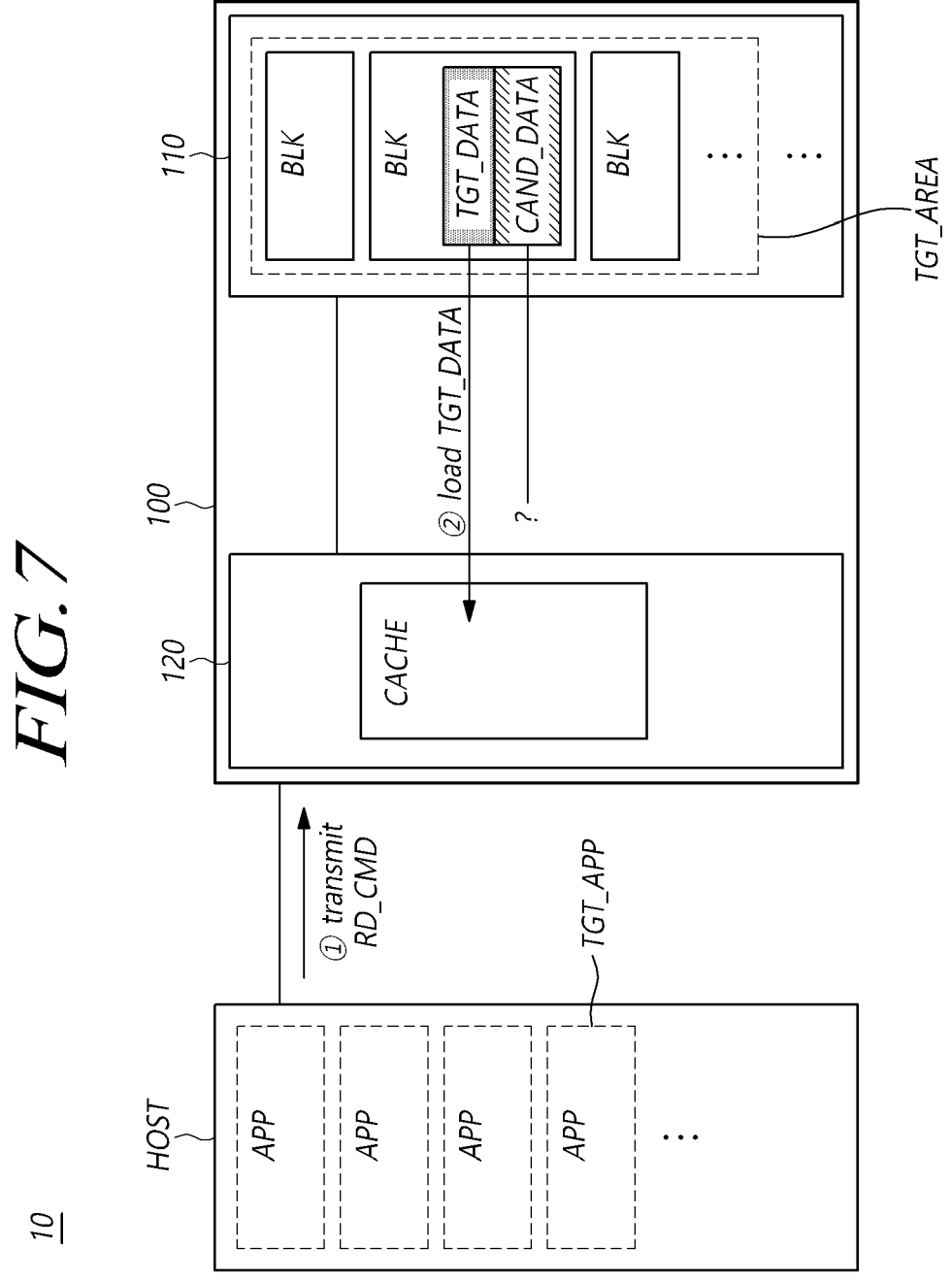
FIGS. 7 to 9 illustrate an operation in which a storage device determines whether to preload candidate data to a cache based on pattern information according to embodiments of the present disclosure.
Figure 8:
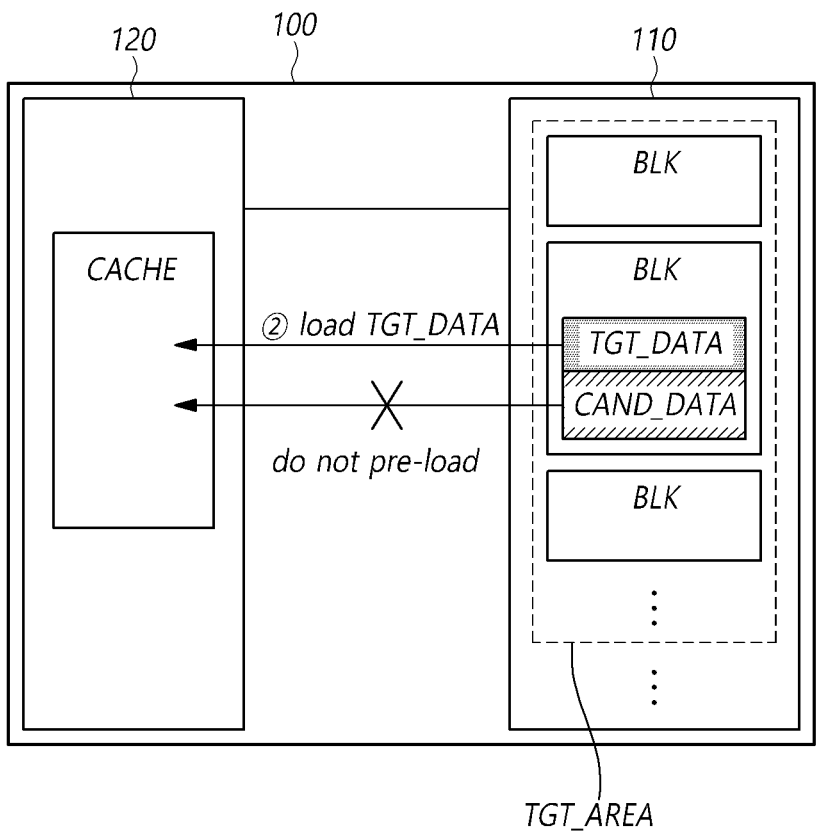
Figure 9:
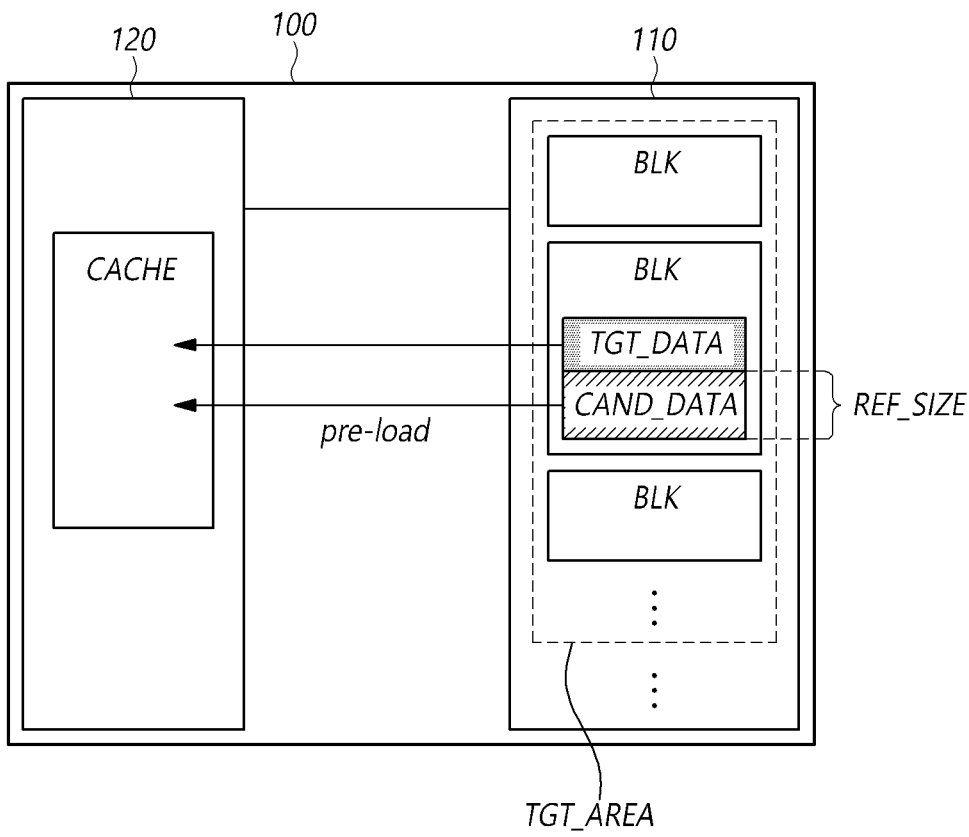

FIGS. 7 to 9 illustrate an operation in which a storage device determines whether to preload candidate data to a cache based on pattern information according to embodiments of the present disclosure.

In FIG. 7, a controller 120 of a storage device 100 may include a cache CACHE. The cache CACHE may cache data stored in a target storage area TGT_AREA. The cache CACHE may be located inside an aforementioned working memory 125 or located in a separate volatile memory.

A target application TGT_APP may request to read target data TGT_DATA stored in the target storage area TGT_AREA. According to the request of the target application TGT_APP, a host HOST may transmit read command RD_CMD to the storage device 100 in order to read the target data TGT_DATA (①).

The controller 120 may load the target data TGT_DATA into the cache CACHE in order to process the request of the host HOST (②).

The controller 120 may determine whether to preload a candidate data CAND_DATA adjacent to the target data TGT_DATA into the cache CACHE. The determination to load data in advance may be based on a pattern information PAT_INFO.

When the candidate data CAND_DATA is adjacent to the target data TGT_DATA, the logical address range corresponding to the candidate data CAND_DATA may be consecutive to the logical address range corresponding to the target data TGT_DATA. FIG. 7 illustrates candidate data CAND_DATA and target data TGT_DATA that are stored in the same memory block, as an example. Even if the candidate data CAND_DATA and the target data TGT_DATA are stored in physically different memory blocks, it may be determined that the candidate data CAND_DATA is adjacent to the target data TGT_DATA.

Preloading the candidate data CAND_DATA into the cache CACHE means that the controller 120 is loading the candidate data CAND_DATA into the cache CACHE in a state in which a read request for the candidate data CAND_DATA has not yet been received. Then, when the controller 120 receives a read request for the candidate data CAND_DATA, the controller 120 may process the read request more quickly by processing the read request using the candidate data CAND_DATA already loaded in the cache CACHE. An operation of preloading the candidate data CAND_DATA into the cache CACHE may be referred to as read-ahead operation for the candidate data CAND_DATA.

The controller 120 determines whether to preload the candidate data CAND_DATA into the cache CACHE based on the pattern information PAT_INFO for the following reasons.

If the host HOST is likely to read the candidate data CAND_DATA after reading the target data TGT_DATA, then the controller 120 may more quickly process a read request of the host HOST for the candidate data CAND_DATA by preloading the candidate data CAND_DATA into the cache CACHE.

On the other hand, if the host HOST is unlikely to read the candidate data CAND_DATA after reading the target data TGT_DATA, then the controller 120 may not preload the candidate data CAND_DATA into the cache CACHE in order to secure a free space in the cache CACHE that would otherwise be occupied by the candidate data CAND_DATA.

Hereinafter, an operation of the controller 120 according to a pattern information PAT_INFO will be described.

In FIG. 8, when a pattern information PAT_INFO is a random pattern, a controller 120 may determine that an operation of preloading the candidate data CAND_DATA into the cache CACHE should not be executed. This is because it is unlikely that the host HOST will read the adjacent candidate data CAND_DATA, continuously or immediately after reading the target data TGT_DATA.

On the other hand, in FIG. 9, when the pattern information PAT_INFO is a sequential pattern, the controller 120 may determine an operation of preloading the candidate data CAND_DATA into the cache CACHE should be performed. This is because it is highly likely that the host HOST will read the adjacent candidate data CAND_DATA, continuously or immediately after reading the target data TGT_DATA.

The size of the candidate data CAND_DATA may be a reference size REF_SIZE. For example, the reference size REF_SIZE may be a multiple of a page size (e.g., 4 KB) included in a memory block BLK.

Figure 10:
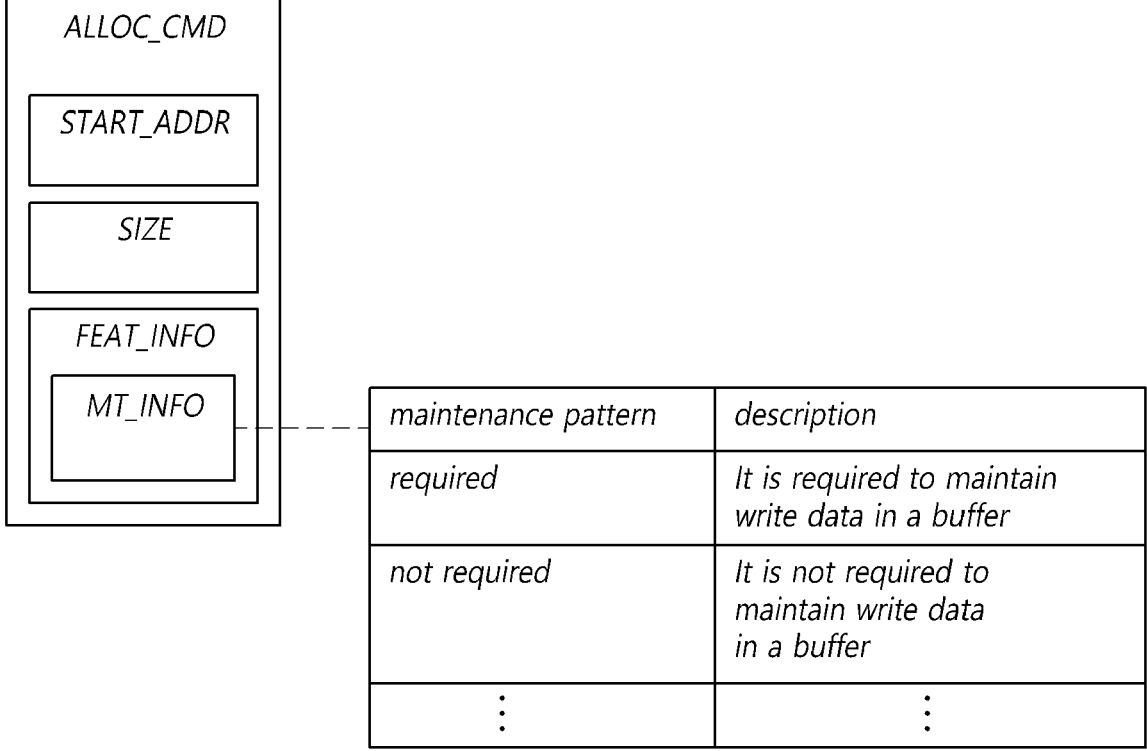
FIG. 10 illustrates another example of feature information according to embodiments of the present disclosure.

FIG. 10 illustrates another example of feature information according to embodiments of the present disclosure.

Referring to FIG. 10, a feature information FEAT_INFO may include maintenance information MT_INFO. The maintenance information MT_INFO is information indicating whether to maintain write data requested by a target application TGT_APP in a buffer after writing the write data into a memory 110.

The buffer is an area allocated in a controller 120 to store the write data before writing the write data to the memory 110. Like the cache CACHE, the buffer may be located in a working memory 125 or located in a separate volatile memory.

When there is a high possibility that the write data will be accessed by the target application TGT_APP after writing the write data to the memory 110, the controller 120 may more quickly process an access request of the target application TGT_APP by using the write data stored in the buffer.

Hereinafter, an operation using maintenance information MT_INFO will be described in detail in FIGS. 11 to 13.

Figure 11:
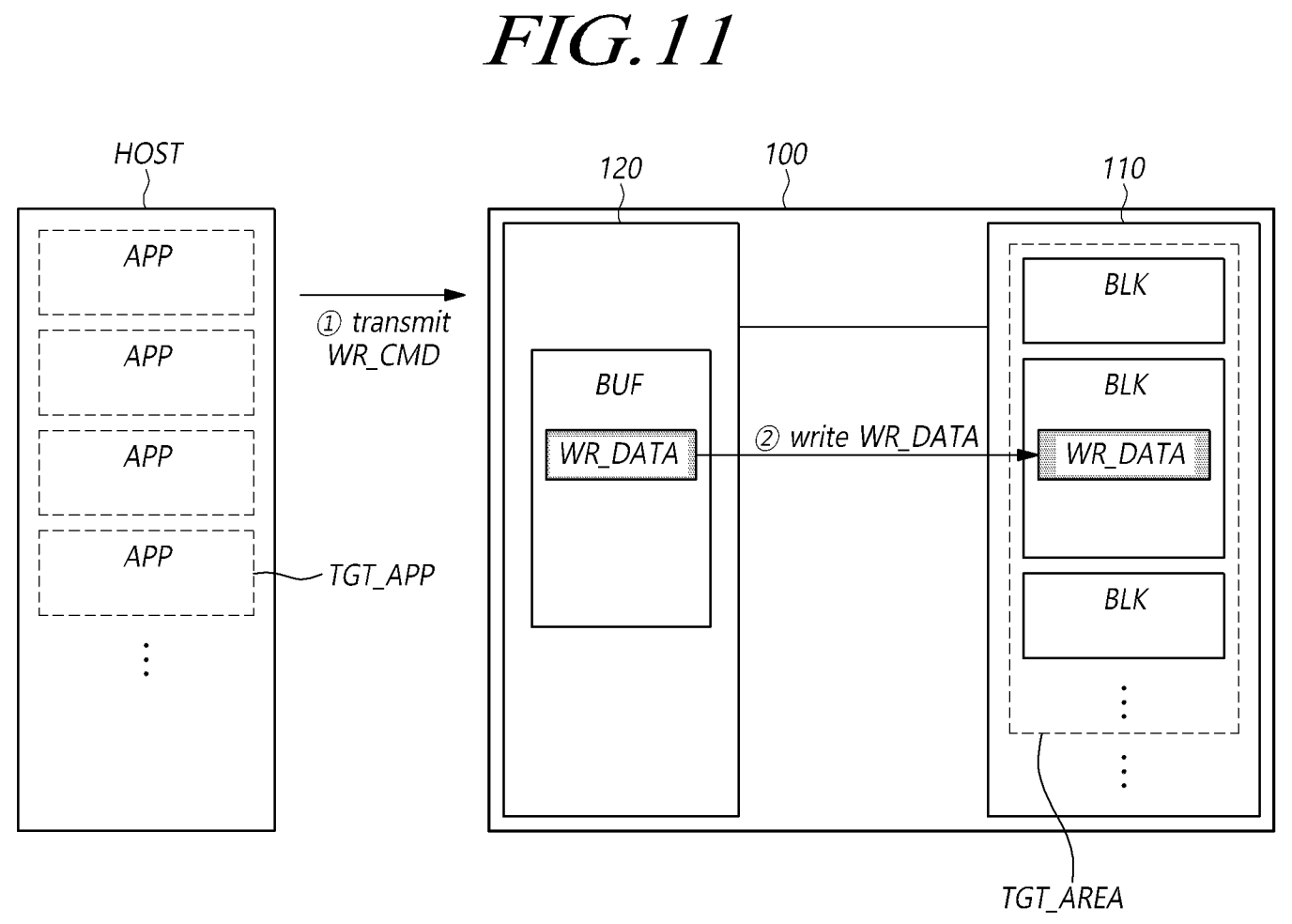
Figure 12:
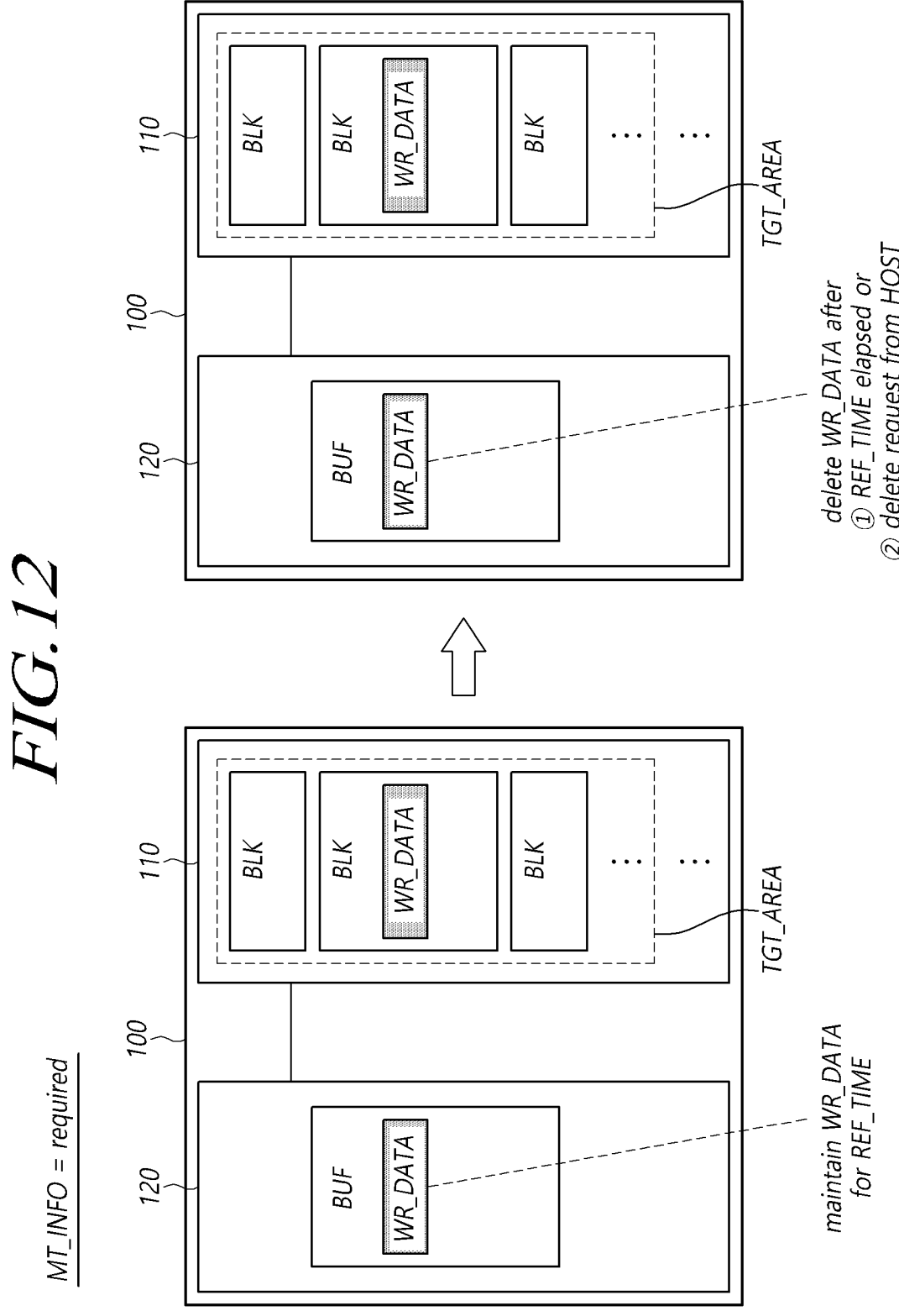
Figure 13:
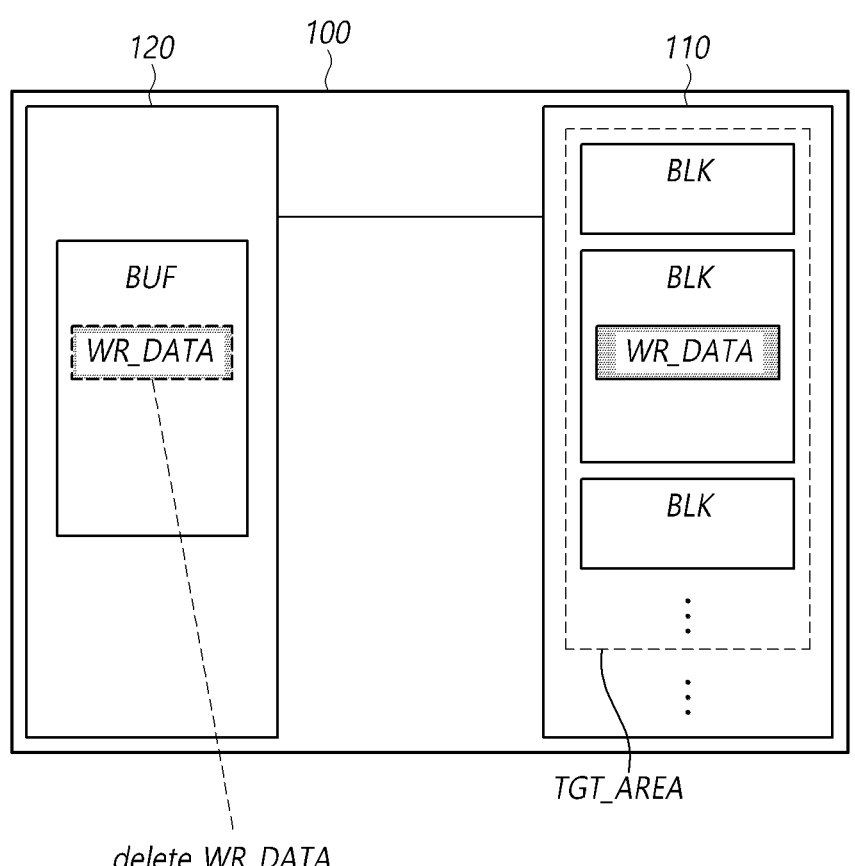

FIGS. 11 to 13 illustrate an operation in which a storage device determines whether to maintain write data in a buffer based on maintenance information according to embodiments of the present disclosure.

Referring to FIG. 11, a host HOST may transmit a write command WR_CMD requesting writing of write data WR_DATA to a storage device 100 (①).

A controller 120 of the storage device 100 may store the write data WR_DATA in a buffer BUF according to the write command WR_CMD. Also, the controller 120 may write the write data WR_DATA to a target storage area TGT_AREA (②).

The controller 120 may determine whether to maintain the write data WR_DATA in the buffer BUF after writing the write data WR_DATA to the target storage area TGT_AREA based on maintenance information MT_INFO.

In FIG. 12, when the maintenance information indicates to maintain the write data WR_DATA in the buffer BUF, the controller 120 may write the write data WR_DATA in the target storage area TGT_AREA and then maintain the write data WR_DATA in the buffer BUF for a reference time period REF_TIME.

For example, the controller 120 may delete the write data WR_DATA from the buffer BUF when the write data WR_DATA is unused after the reference time period REF_TIME has elapsed. As another example, the controller 120 may delete the write data WR_DATA from the buffer BUF when receiving a request from the host HOST indicating that the write data WR_DATA should be deleted.

In FIG. 13, when the maintenance information MT_INFO indicates the write data WR_DATA in the buffer BUF should not be maintained, the controller 120 may write the write data WR_DATA to the target storage area TGT_AREA and then delete the write data WR_DATA from the buffer BUF.

Figure 14:
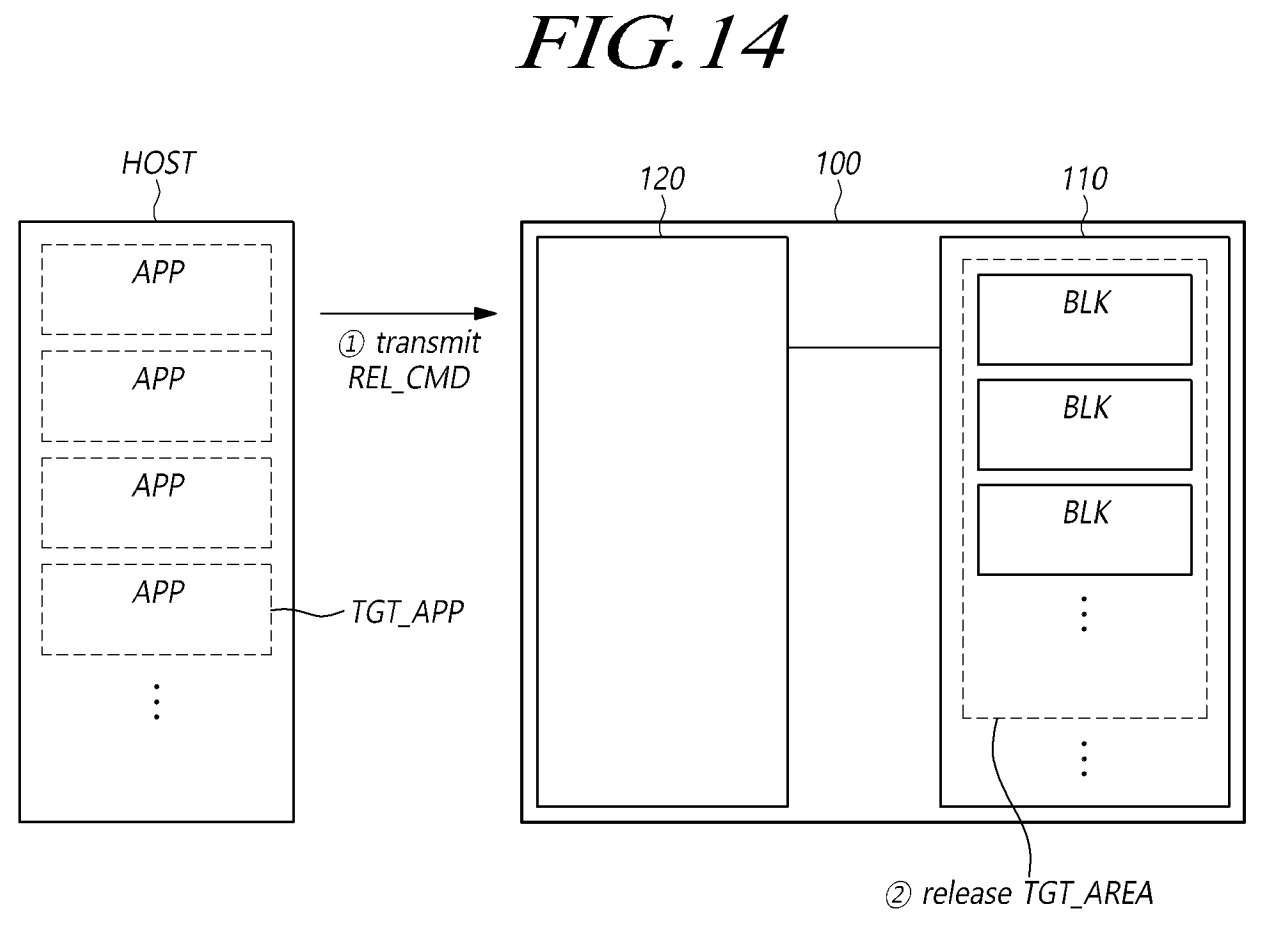

FIG. 14 illustrates an operation in which a storage device 100 releases a target storage area according to embodiments of the present disclosure.

Referring to FIG. 14, a controller 120 of a storage device 100 may receive a release command REL_CMD requesting release of a target storage area TGT_AREA from a host HOST (①).

The controller 120 may release the target storage area TGT_AREA based on the received release command REL_CMD (②). When the target storage area TGT_AREA is released, applications other than the target application TGT_APP can access the memory blocks BLK previously included in the target storage area TGT_AREA.

FIG. 15 illustrates an operating method of a storage device according to embodiments of the present disclosure.

Referring to FIG. 15, a method of operating a storage device 100 may include receiving an allocate command ALLOC_CMD, which is a command requesting allocation of a target storage area TGT_AREA accessible only to a target application TGT_APP from among a plurality of applications APP running on a host HOST, from the host HOST (S1510).

In the operating method, the storage device 100 may set the target storage area TGT_AREA based on the allocation command ALLOC_CMD received in the operation S1510 (S1520).

The operating method of the storage device 100 may further include controlling an operation for the target storage area TGT_AREA based on a feature information FEAT_INFO of the target storage area TGT_AREA received from the host HOST.

For example, the feature information FEAT_INFO may include a pattern information PAT_INFO indicating a predicted access pattern used by the target application TGT_APP to access the target storage area TGT_AREA. The pattern information PAT_INFO may be one of a plurality of candidate pattern information units, which may include random pattern and sequential pattern.

An operation S1530 may determine, when the target application TGT_APP requests to read the target data TGT_DATA stored in the target storage area TGT_AREA, whether to execute an operation of preloading candidate data CAND_DATA adjacent to the target data TGT_DATA into a cache CACHE, which caches data stored in the target storage area TGT_AREA, based on the pattern information PAT_INFO. For example, in the operation S1530, a controller 120 may determine not to execute an operation of preloading the candidate data CAND_DATA into the cache CACHE when the pattern information PAT_INFO is a random pattern. The controller may, however, determine to execute an operation of preloading the candidate data CAND_DATA of the reference size REF_SIZE into the cache CACHE when the pattern information PAT_INFO is a sequential pattern.

As another example, the feature information FEAT_INFO may include a maintenance information MT_INFO indicating whether to maintain a write data WR_DATA in a buffer BUF, which stores the write data WR_DATA requested by the target application TGT_APP, after writing the write data WR_DATA in the target storage area TGT_AREA.

In this example, in the operation S1530, the controller 120 may maintain the write data WR_DATA in the buffer BUF for a reference time period REF_TIME after writing the write data WR_DATA to the target storage area TGT_AREA when the maintenance information MT_INFO indicates to maintain the write data WR_DATA in the buffer BUF. The controller 120, however, at operation S1530 may delete the write data WR_DATA from the buffer BUF after writing the write data WR_DATA to the target storage area TGT_AREA when the maintenance information MT_INFO indicates not to maintain the write data WR_DATA in the buffer BUF.

The operating method of the storage device 100 may selectively include receiving a release command REL_CMD requesting release of the target storage area TGT_AREA from the host HOST (S1540), and releasing the target storage area TGT_AREA based on the release command REL_CMD (S1550).

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. An operating method of a storage device, the operating method comprising:

receiving an allocation command, from a host, requesting allocation of a target storage area accessible only to a target application from among a plurality of applications running on the host;

setting the target storage area based on the allocation command; and controlling an operation for the target storage area based on feature information of the target storage area received from the host, wherein the feature information includes pattern information indicating a predicted access pattern applied by the target application to the target storage area, wherein the pattern information is one of a plurality of candidate pattern information units, wherein the plurality of candidate pattern information units includes a random pattern that indicates the target application is expected to randomly access the target storage area, a sequential pattern that indicates the target application is expected to sequentially access the target storage area, and a general pattern that indicates no predetermined access pattern, wherein the controlling an operation for the target storage area includes determining, when the target application requests to read target data stored in the target storage area, whether to execute an operation of preloading candidate data adjacent to the target data into a cache, which caches data stored in the target storage area, based on the pattern information, determining not to execute an operation of preloading the candidate data into the cache when the pattern information is a random pattern, determining to execute an operation of preloading the candidate data of a reference size into the cache when the pattern information is a sequential pattern, and wherein the candidate data is adjacent to the target data when a logical address range corresponding to the candidate data is consecutive to a logical address range corresponding to the target data.

2. The operating method of claim 1, wherein the feature information includes maintenance information indicating whether to maintain write data in a buffer, which stores write data requested by the target application, after writing the write data in the target storage area.

3. The operating method of claim 2, wherein the controlling an operation for the target storage area includes maintaining the write data in the buffer for a reference time period after writing the write data to the target storage area when the maintenance information indicates to maintain the write data in the buffer, and deleting the write data from the buffer after writing the write data to the target storage area when the maintenance information indicates not to maintain the write data in the buffer.

4. The operating method of claim 1, further comprising:

receiving a release command requesting release of the target storage area from the host; and releasing the target storage area based on the release command.

5. A storage device comprising:

a memory including a plurality of memory blocks; and a controller configured to:

receive an allocation command, from a host, requesting allocation of a target storage area accessible only to a target application among a plurality of applications running on the host, set one or more of the plurality of memory blocks as the target storage area based on the allocation command, and control an operation on the target storage area based on feature information of the target storage area received from the host, wherein the feature information includes pattern information indicating a predicted access pattern applied by the target application to the target storage area, wherein the pattern information is one of a plurality of candidate pattern information units, wherein the plurality of candidate pattern information units includes a random pattern that indicates the target application is expected to randomly access the target storage area, a sequential pattern that indicates the target application is expected to sequentially access the target storage area, and a general pattern that indicates no predetermined access pattern, wherein the controller further comprises a cache caching data stored in the target storage area, wherein the controller is configured to determine, when the target application requests to read target data stored in the target storage area, whether to execute an operation of preloading candidate data adjacent to the target data into the cache based on the pattern information, to determine that the candidate data is adjacent to the target data when a logical address range corresponding to the candidate data is consecutive to a logical address range corresponding to the target data, to determine not to execute an operation of preloading the candidate data into the cache when the pattern information is a random pattern, and to determine to execute an operation of preloading the candidate data of a reference size into the cache when the pattern information is a sequential pattern.

6. The storage device according to claim 5, wherein the allocation command includes start address information, size information and the feature information of the target storage area.

7. The storage device according to claim 5, wherein the controller further comprises a buffer storing write data requested by the target application, and wherein the feature information includes maintenance information indicating whether to maintain the write data in the buffer after writing the write data in the target storage area.

8. The storage device according to claim 7, wherein the controller is configured to:

maintain the write data in the buffer for a reference time period after writing the write data to the target storage area when the maintenance information indicates to maintain the write data in the buffer, and delete the write data from the buffer after writing the write data to the target storage area when the maintenance information indicates not to maintain the write data in the buffer.

9. The storage device according to claim 5, wherein the controller is configured to:

receive a release command requesting release of the target storage area from the host, and release the target storage area based on the release command.

10. A system comprising:

a host executing a plurality of applications; and a storage device configured to:

receive an allocation command, from a host, requesting allocation of a target storage area accessible only to a target application among a plurality of applications running on the host, set one or more of a plurality of memory blocks as the target storage area based on the allocation command, and control an operation for the target storage area based on feature information of the target storage area received from the host, wherein the feature information includes pattern information indicating a predicted access pattern applied by the target application to the target storage area, wherein the pattern information is one of a plurality of candidate pattern information units, wherein the plurality of candidate pattern information units includes a random pattern that indicates the target application is expected to randomly access the target storage area, a sequential pattern that indicates the target application is expected to sequentially access the target storage area, and a general pattern that indicates no predetermined access pattern, wherein the storage device further comprises:

a cache caching data stored in the target storage area, wherein the storage device is configured to determine, when the target application requests to read target data stored in the target storage area, whether to execute an operation of preloading candidate data adjacent to the target data into the cache based on the pattern information, to determine that the candidate data is adjacent to the target data when a logical address range corresponding to the candidate data is consecutive to a logical address range corresponding to the target data, to determine not to execute an operation of preloading the candidate data into the cache when the pattern information is a random pattern, and to determine to execute an operation of preloading the candidate data of a reference size into the cache when the pattern information is a sequential pattern.

\* \* \* \* \*